May 22, 1934.　　　　F. S. SMITH　　　　1,960,173
ART AND APPARATUS FOR STERILIZING
Original Filed Oct. 1, 1931　　　3 Sheets-Sheet 1

Franklin S. Smith
INVENTOR

BY his ATTORNEYS
Janney, Blair & Curtis

May 22, 1934.   F. S. SMITH   1,960,173
ART AND APPARATUS FOR STERILIZING
Original Filed Oct. 1, 1931   3 Sheets-Sheet 3

Franklin S. Smith
INVENTOR

BY his ATTORNEYS
Janney, Blair & Curtis

Patented May 22, 1934

1,960,173

UNITED STATES PATENT OFFICE 1,960,173

ART AND APPARATUS FOR STERILIZING

Franklin S. Smith, New Haven, Conn.

Application October 1, 1931, Serial No. 566,261
Renewed August 23, 1933

32 Claims. (Cl. 175—311)

This invention relates to an art and apparatus for destroying insect life in food and other products.

One of the objects of this invention is to provide a thoroughly practical and efficient art and apparatus for subjecting food and other products that contain insects and/or their eggs, larvæ and pupæ thereof to effective and reliable treatment for destroying such insect life as has just been noted without endangering or harming the product itself. Another object is to provide an art and apparatus of the above-mentioned character for achieving destruction of such insect life electrically and in a manner that may be rapidly carried out in practice and that lends itself readily to being carried on economically and efficiently on a commercial scale. Another object is to provide an art and apparatus of the above-mentioned character in which thoroughly dependable and rapid destruction of insect life may be achieved without unduly large expenditures of electrical energy and in which a relatively lower but nevertheless relatively high potential may be efficiently utilized. Another object is to provide an apparatus of the above-mentioned character in which a wide variation in practical requirements may be quickly and reliably met. Other objects will be in part obvious or in part pointed out hereinafter.

The invention accordingly consists in the features of construction, combinations of elements, arrangements of parts and in the several steps and relation and order of each of the same to one or more of the others, all as will be illustratively described herein, and the scope of the application of which will be indicated in the following claims.

In the accompanying drawings, in which are shown several of the various possible embodiments of the mechanical features of my invention.

Similar reference characters refer to similar parts throughout the several views of the drawings.

Figures 1, 2, 3, 4, 5, 6, 7:
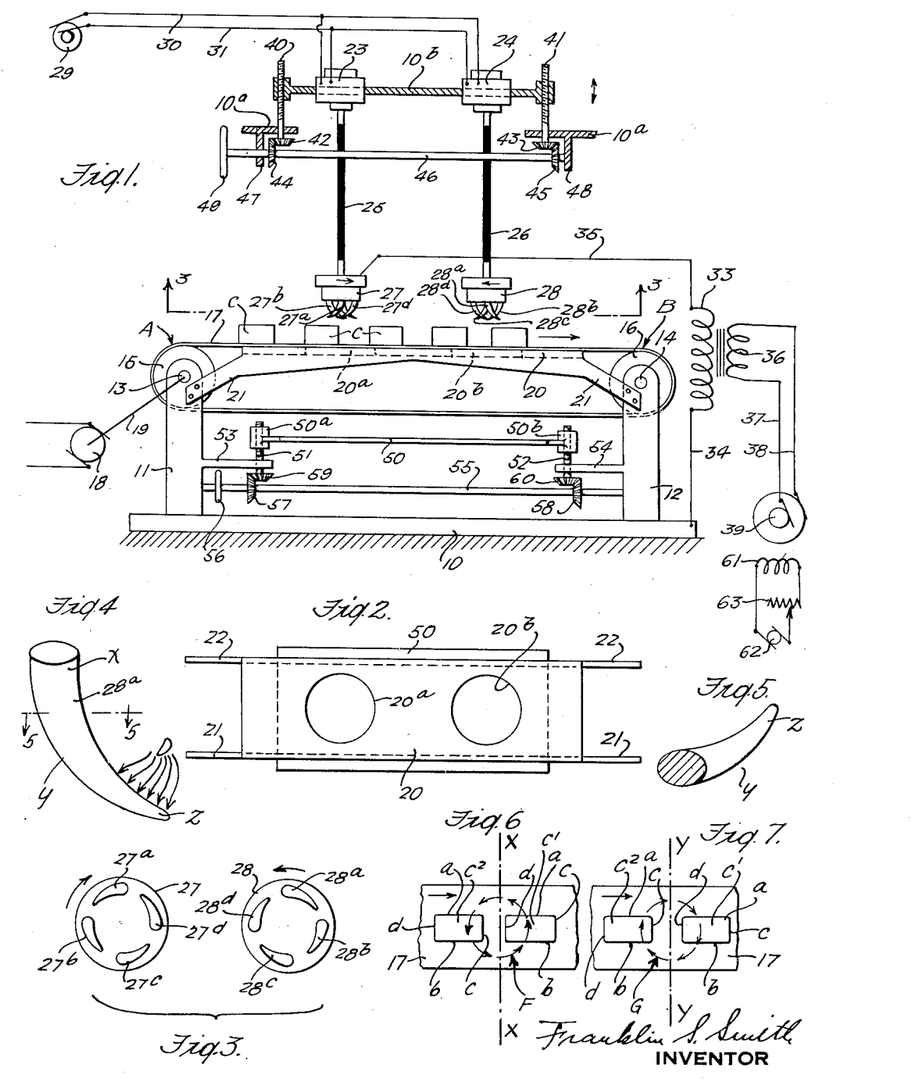
Figure 1 is a front elevation of one form of apparatus, certain parts being shown diagrammatically.
Figure 2 is a detached plan view of a belt support used in the apparatus of Figure 1.
Figure 3 is a view on an enlarged scale, as seen along the line 3—3 of Figure 1, of the preferred arrangement of certain electrodes.
Figure 4 is a front elevation on an enlarged scale of an electrode member.
Figure 5 is a horizontal sectional view as seen along the line 5—5 of Figure 4.
Figures 6 and 7 are fragmentary plan views of the conveyor belt showing packages thereon and indicating diagrammatically certain actions thereon of the different electrode structures.

Referring now to Figure 1, there is indicated diagrammatically a suitable frame 10 provided at its respective ends with appropriate pairs of standards 11 and 12 in which are suitably journaled the shafts 13 and 14, respectively, of drums 15 and 16, respectively, about which extends a conveyor belt 17, the latter being made of asbestos or a suitable canvas or cotton material, or the like.

One of the drums, such as the drum 15, is suitably driven and I have diagrammatically indicated a motor 18 connected to the drum 15 by any suitable transmission diagrammatically indicated at 19 for driving the pulley or drum 15 and for thus causing a movement of the belt 17. The direction of drive is preferably such that the drums rotate in clockwise direction and hence so that the upper portion of the belt 17 moves in a direction from the left to the right, as viewed in Figure 1. Illustratively, the rate of drive of the pulley 15 may be such that the movement of the belt 17 takes place at a rate of about 15 feet per minute but it is not to be understood that this is a limiting rate of drive but that the belt may be driven at any other suitable speed.

The belt 17 is adapted to receive at its left-hand end, as at the point A, the material or goods or articles to be sterilized and thus to transport the goods in a direction toward the right and to discharge them at the right-hand end of the belt as at the point B. Any suitable means, not shown, may be utilized to feed the articles onto the belt and to receive them when discharged therefrom.

Underneath the article-carrying portion of belt 17 and extending lengthwise thereof is a plate-like member 20 (see also Figure 2) having a width equal to or greater than the width of the belt 17; member 20 aids to prevent sagging of the belt 17 under its load and insures the passage of the goods or articles to be treated along the intended and predetermined path.

Plate member 20 is made of any suitable solid dielectric material, such as laminated bakelite, and is of itself reinforced by downwardly directed and lengthwise extending members 21 and 22, also of solid dielectric material, which are extended beyond the right and left-hand ends of the plate member 20 to a sufficient extent to be secured to the frame 10, as to the pairs of standards 11 and 12 of the latter.

The upper portion of the frame 10 indicated in Figure 1 at 10$^a$ supports a plurality of electric motors illustratively shown as two in number at 23 and 24, the motors being supported preferably with their shafts extending vertically. To the lower ends of the shafts of these motors are connected driving members 25 and 26, respectively, made of solid dielectric material and these in turn support at their lower ends metallic disk-like members 27 and 28, respectively. Motors 23 and 24 are supplied with energy from any suitable source diagrammaticaly indicated at 29 through line conductors 30 and 31 and are driven at a speed and in directions illustratively described below.

The metallic disk member 28 has secured to its lower face, as viewed in Figure 1, a plurality of electrode members, illustratively four in number and shown in Figure 1 at 28$^a$, 28$^b$, 28$^c$ and 28$^d$. These electrode members are preferably of identical construction and in Figure 4 one of them, illustratively member 28$^a$, is shown on an enlarged scale. It will be seen to have a downwardly extending portion indicated at $x$ and a lower end or somewhat pointed portion $z$ connected by an intermediate portion $y$ which is curved in two directions, being curved downwardly and toward the right and, as is better shown in Figures 3 and 5, is also curved to conform relatively closely to the arc of the circle along the circumference of which the four electrode members 28$^a$, 28$^b$, 28$^c$ and 28$^d$ are equidistantly spaced. Motor 24 is driven in a direction to cause the electrode structure 28 to rotate in the direction of the arrows indicated in Figures 1 and 3, the portion $x$ of each electrode member being the leading portion and the tip $z$ being the trailing portion.

Disk member 27 is also provided with electrode members, illustratively four in number and shaped substantially like the members above described in connection with the electrode construction 28; they are likewise equidistantly spaced about a circle on the under surface of the disk member 28 (see Figure 3) but, motor 23 being driven so as to rotate disk member 27 in a direction opposite from the direction of rotation of the electrode construction 28, the electrode members 27$^a$, 27$^b$, 27$^c$ and 27$^d$ are reversed in position so that again the portions $x$ thereof are the leading portions and the tip or substantially pointed ends $z$ thereof are the trailing portions. This relation of these parts is better shown in Figure 3.

The electrode members depending from the disk members 27 and 28, as appears better from Figure 4, are tapered and are of substantially circular cross-section where the section is taken at right angles through any point along the curved center or axis of the electrode member; this relation is of great advantage inasmuch as the horizontal section taken through any one member, such as the section 5—5 of Figure 4, is substantially elliptical (see Figure 5) and thus gives a section that is substantially stream-line with respect to the actual movement of the electrode member about its axis of rotation. The resultant substantially elliptical or stream-line cross-section is all the more emphasized the nearer that the horizontal section approaches the tip end $z$. The purpose of this construction will be later dealt with herein.

The electrode structures 27 and 28, thus driven in opposite directions, are rotated at a speed illustratively about 1800 R. P. M., the tip ends $z$ thus presenting in a substantially horizontal plane spaced upwardly from the belt 17 the effect of a great multiplicity of individual discharge points. The spacing between the horizontal plane of these discharge points and the upper surface of conveyor belt 17 and through which spacing the products or articles to be sterilized are to pass, may be varied in any suitable manner as, for example, by raising or lowering, preferably conjointly or simultaneously, the disk-like members or electrode structures 27 and 28; an illustrative embodiment of an arrangement for so raising or lowering the latter is shown in Figure 1.

Motors 23 and 24 are carried by or secured to an auxiliary frame member 10$^b$ which is mounted for vertical movement with respect to the frame portion 10$^a$. Conveniently and preferably I provide rotatable screws 40 and 41 extending vertically and threaded into suitably threaded parts of the auxiliary frame 10$^b$, the screws 40—41 being rotatably supported in suitable bearings in the upper portion 10$^a$ of the frame, the mounting being of such a character that rotation of the screws may take place while movement of the latter in the direction of their respective axes is prevented. The lower ends of the screws have secured thereto bevel gears 42 and 43, respectively, with which mesh bevel gears 44 and 45, respectively, the latter being secured to a shaft 46 mounted in suitable bearings 47—48 carried by the frame portion 10$^a$. A hand wheel 49 secured to shaft 46 permits a manual rotation of the shaft 46 and hence control of the direction and extent of rotation of the screws 40—41 and thus the spacing of the disk-like electrode structures 27 and 28 above the belt 17 may be controlled or determined at will, for a purpose to be more clearly set forth hereinafter.

The various discharge or electrode members carried by the disk members 27 and 28 will thus be seen to be dependably insulated (through non-conducting members 25—26) from the frame of the apparatus and may, as is more clearly set forth below, be thus subjected to a suitable relatively high potential while at the same time control of their height above the belt and their distance from other coacting parts of the apparatus to be more clearly described hereinafter may be dependably and reliably achieved.

Underneath the conveyor belt 17 and preferably though not necessarily underneath the lower strand thereof, is positioned what I shall term a condenser plate 50 (see Figures 1 and 2), this plate being made of a suitable metal, conveniently a sheet metal of suitable thickness and having a dimension crosswise of the belt (see Figure 2) preferably somewhat in excess of the width of the belt itself or the width of the plate 20 while its length (see Figure 1) is somewhat in excess of the over-all dimension of the electrode structures 27 and 28 in the direction of the length of the machine.

The plane of the condenser plate 50 is parallel to the plane of the tip ends z of the electrode members of the structures 27 and 28 and plate 50 is mounted in any suitable manner so that it may be moved in a vertical direction but parallel to itself. An illustrative form of mounting is shown in Figure 1 and will be seen to include screws 51 and 52 that extend vertically and that are threaded into suitable brackets 50ª and 50ᵇ at the ends of the plate 50. Screws 51—52 are supported in suitable bearings so that they may be rotated about their vertical axes while held against longitudinal movement; conveniently, these bearings may be supported by or formed in suitable brackets 53 and 54 secured to the frame 10 or to the standards 11—12, respectively. The frame 10, and conveniently the standards 11—12, rotatably support a shaft 55 provided with a hand wheel 56 so that shaft 55 may be manually rotated. Bevel gears 57 and 58 fixed on shaft 55 transmit the rotation of the latter to the elevating screws 51—52 by means of bevel gears 59 and 60, respectively, secured to the screws 51 and 52, respectively.

Thus, plate 50 may be raised or lowered at will independently of or in conjunction with the raising or lowering of the electrode structures 27 and 28.

Immediately underneath the rotating electrode structures 27 and 28, plate member 20 is provided with circular openings 20ª and 20ᵇ (see Figures 1 and 2), the diameter of these openings being considerably greater than the diameter of the circle about which the electrode members 28ª, 28ᵇ, etc. and 27ª, 27ᵇ, etc. are spaced about the supporting disks 28 and 27, respectively. For example, openings 20ª and 20ᵇ may be about twice the diameter of the circle of the electrode members.

A suitable high potential, preferably alternating, is impressed across the electrode structures 27—28 and the plate 50 and the latter is preferably and conveniently grounded to the frame 10. As illustrative of a preferred form of source of high potential, I have shown in Figure 1 the high voltage winding 33 of a transformer, one terminal of which is connected as by conductor 34 to the frame 10 and hence to the condenser plate 50 while the other terminal is connected by conductor 35 to the electrode structures 27—28, the latter being thus maintained at high potential. The low voltage winding 36 of the transformer is energized by a suitable source of alternating current of preferably relatively high frequency and illustratively and preferably is connected, as by conductors 37 and 38, to an alternator 39 of a frequency on the order of 640 cycles per second. The ratio of transformation is such that the potential applied to the disk electrodes 27—28 is on the order of 150,000 volts, that potential difference thus existing between the above described parts 27—50 and 28—50 which form in effect capacities or condensers in the high voltage circuit.

In view of the various factors, some of which are pointed out below, I prefer to achieve a change in the potential applied to the apparatus and accordingly I have shown in Figure 1 an illustrative way in which the voltage applied may be changed at will; thus the alternator 39 has an exciting field 61 energized by a suitable exciter 62 and a variable resistance 63 is provided to change the excitation of the alternator 39 so as to change the voltage of its output and hence to change the voltage of the high voltage winding 33.

It is to be understood, however, that the specific frequency of 640 cycles above-mentioned is not to be treated by way of limitation and that the same is true with respect to the above-mentioned voltage, these factors, together with the speed of travel of the belt and the thickness and nature of the material to be treated being appropriately proportioned with respect to each other. The illustrative figures above set forth may, however, be considered as illustrative where the material to be treated is, for example, corn-meal that is packaged in packages having a vertical dimension as viewed in Figure 1 of about two inches, thus giving the material undergoing sterilization a thickness of about two inches. Under these illustrative conditions, the spacing of the horizontal plane of the tips z of the electrode members from the upper surface of the cornmeal, shown in Figure 1 as contained in packages C, is about three-eighths of an inch while the spacing of this horizontal plane of the tips z of the electrode members from the other condenser element 50 may be approximately thirty inches. If it is desired to use a frequency higher than the illustrative frequency above-mentioned the speed of the belt may be substantially commensurately increased; likewise by increasing the number of electrode members carried by the disks 27 and 28, a greater speed of travel of the belt may be achieved.

Assuming no material, articles, or products, to be on the belt 17, there is in the circuit of the high voltage winding 33 the parallel capacities 27—50 and 28—50 and a displacement current flows through these capacities; inasmuch, however, as the effective conducting portions of the electrode constructions 28 and 27 closely approximate points (see the tip ends z of Figure 4) the voltage gradient is high in the region underneath the electrode members 28ª, 28ᵇ, etc. and 27ª, 27ᵇ, etc. and diminishes rapidly as the part 50, at ground potential, is approached. Probably about 90% of the voltage drop across the above-mentioned capacities takes place throughout the region above the article-carrying portion of the belt 17.

As the articles or material to be treated, illustratively packaged material such as that above-mentioned and indicated in Figure 1 at C, is placed upon the belt at point A, the articles are brought by the belt first into the region of high voltage gradient underneath the electrode construction 27 and subsequently in a similar region of high voltage gradient immediately underneath the electrode construction 28.

Considering first the action that takes place as the articles come underneath the electrode construction 27, it is first to be noted that the material, illustratively corn-meal, as well as the pasteboard or paper package in which it is contained, has a permittivity that is considerably higher than the air which theretofore constituted the dielectric between the condenser elements 27 and 50, the opening 20ª in the plate-like supporting member 20 (see Figure 2) being sufficiently great to avoid the interpositioning between these condenser elements of solid dielectric material having also a permittivity greater than that of air. The material, corn-meal with its package, and hereinafter referred to, for convenience, as the "material C", is carried by the belt across and over the opening 20ª in the supporting plate 20, and, having a higher permittivity as above-mentioned, brings about such a re-distribution of the potential difference between the parts 27 and 50 that the now serially related dielectrics between the parts 27 and 50 represented by the material C and the air above and below the latter are incapable of withstanding the potential difference with the result that a corona discharge takes place from the tip ends z of the electrode members 27ª, 27ᵇ, etc. and through the material C.

However, the paper or pasteboard constituting the package within which the corn-meal is contained is not punctured by this corona discharge, the walls of the carton or package acting as condenser dielectrics in the high voltage circuit; the air within the carton and intervening the particles of the corn-meal as well as the air between the carton and the electrode tips z of the member 27 is in the field of high voltage gradient and is thus easily and quickly ionized, having also a low dielectric time lag, while the air dielectric between the belt and the condenser plate 50, because of the relatively great length of the flux path therethrough and because of the relatively low voltage gradient throughout that path, is not ionized at all and is thus incapable of breaking down, thus preventing a complete disruption of the gap between the tips z of the electrode structure 27 and the other condenser element 50. I may, however, shorten this flux path, as by diminishing the distance of the material from the condenser plate 50, as by raising the latter by hand-wheel 56, so that some ionization of the air dielectric in this path may take place with or without accompanying local corona discharge. But the shorter that I make this flux path, the more intense are the individual corona streamers emanating from the individual electrode members or tips and the less are they in number; however, I prefer the arrangement above initially described inasmuch as I thereby achieve the emanation of many fine corona streamers from the individual electrodes and thus achieve a more thorough permeation of the material undergoing treatment with the discharge that destroys the insect life. Also, the spacing from the under side of material on the belt to the condenser plate 50 is preferably such that the condenser formed therebetween can per se safely withstand the potential of the system inasmuch as the rupture of the dielectrics, resulting in corona discharge, that extend between the electrode tips and the belt, substantially subjects the condenser formed by the material-carrying belt and the grounded plate 50 to substantially the total voltage of the system. Thus, complete disruption between the electrode tips and the grounded plate 50 may be safeguarded against.

In the operation of the apparatus the half waves of the alternating potential which are substantially effective are those which cause positive corona streamers at the tips of the electrodes.

It may at this point be noted that the packaged material, such as corn-meal, flour, or the like, and assumed to be contaminated with insect life, may be considered as a heterogeneous dielectric made up of various dielectrics in series multiple arrangement and containing isolated capacities, the latter being the contaminations represented by the various stages of insect life. If the material is packaged, the pasteboard, paper, or the like, of the package itself, constitutes a dielectric of one permittivity, the individual particles of the meal, flour, or the like, constituting a dielectric of still another permittivity, and the air intervening these particles constitute still another dielectric but one of lowest permittivity of all, namely, unity. When this heterogeneous dielectric enters the treatment zone, the dielectrics of higher permittivity cause over-stressing of the air dielectric with resultant ionization and breakdown thereof. The contaminating particles, such as insects, eggs, larvæ or pupæ thereof, are, however, of substantially infinite permittivity and are in effect conducting so that the corona streamers virtually seek out and pass through these contaminating particles and thus effectively bringing about their destruction.

In thus preventing complete disruption of the air between the electrode structure and the ground plate 50, puncturing of the material of the carton is prevented. Were complete disruption to take place, substantially the entire transformer voltage would be impressed upon the material of which the carton is made, with resultant puncturing.

The provision of the opening 20ª across which the material to be treated is passed or carried by the belt 17, assures also that flux concentration takes place in the material undergoing treatment; one of the features of action that comes into play in this connection is the fact that, prior to the arrival of the material over the opening, the dielectric medium between the electrode structure 27 and the companion condenser element 50, is air and hence is of a permittivity of substantially unity but when the material C, either packaged or unpackaged, is interposed between the condenser elements 27 and 50, the material, having a much higher permittivity than that of air, causes the flux in the field to concentrate therein on account of the higher permittivity thereof, this concentration being, by the provision of the openings, such as opening 20ª, not materially disturbed or interfered with. The thus concentrated flux in the material to be treated achieves a rapid ionization of the air intervening the particles of the material where the latter takes the form of flour, meal, or the like, and thus quickly and rapidly achieves the corona discharge therethrough and through the particles of the material to achieve destruction of insect life and the like.

With the material C in position to be subjected to the discharge, the serial arrangement of the low permittivity air dielectric and of the high dielectric of the material itself has above been pointed out; these relatively widely differing permittivities of the corn-meal, for example, and of the remaining air, achieve an electrical capacity of the system greater than the electric capacity that existed before the material C entered this treatment zone so that there is an increase in the resultant current flow; but the available relatively high potential also is somewhat redistributed because of the serially arranged dielectrics of these differing permittivities and in fact is distributed inversely to the permittivities involved. There is thus achieved a lesser voltage drop across the material undergoing treatment than existed in the equivalent air space before the material came into the treatment zone and this factor contributes also toward safeguarding the package or carton against puncturing.

The above-described actions take place simultaneously between each individual electrode tip $z$ (illustratively four in number as above noted) and the condenser plate 50, and due to the relatively rapid rotation of the electrode structure 27 and the electrode members carried thereby, the substantially vertical axis from one electrode tip to the plate 50 is moved in a curved path (as viewed in a horizontal plane) crosswise of the package or of the mass of meal, flour, or the like, being transported by the belt and thus, as the articles or product continue to move toward the right, as viewed in Figure 1, all portions of the meal, flour, or the like, are subjected to the actions above-described. Preferably, the dimension of the mass of infested material in a direction crosswise of the belt is less than the diameter of the circle around which the electrode members $27^a$, $27^b$, etc. are spaced and the path of movement is preferably such that the middle point of this lateral dimension passes immediately underneath the axis of rotation of the electrode structure 27. As above pointed out, the direction of rotation is such that the portion $x$ of the electrode members (see Figure 4) is the leading portion while the tip $z$ is the trailing portion, and I have also pointed out the stream-line cross-section of the electrode members. The stream-line cross-section substantially prevents rarefication of air in the regions indicated generally at D in Figure 4 with consequent avoidance of a weakening of the dielectric strength of the air at those portions; thus, the corona discharge is made to emanate from the tip $z$ and not from portions higher up along the electrode members such as might be the case if the dielectric properties of the air were to be weakened as along the portions D. Thus, I am enabled with nicety and precision to control and maintain the actions described above.

It will be clear in view of what has above been said that all portions of the individual electrode members are, of course, maintained at the relatively high potential, but considering any portion of the material undergoing treatment underneath a point E, for example (Figure 4), of the curved portion $y$ to $z$, such point or portion has the effect of commencing the stressing of the air above the material to be treated and of the air intervening the particles of the material to be treated and as the electrode member continues its movement, in its arc of travel, over the particular part or portion of the material under consideration, this stressing or preliminary ionization of this air is increased by way of preparation for corona discharge from the tip portion $z$ which, being lowermost and hence nearest the material undergoing treatment, completes the stressing or ionization of this air to achieve the corona discharge above described.

The spacing between the rollers 15 and 16 that carry the belt 17 is made preferably relatively large so that substantial lengths of belt are interposed between the rollers and the portion of the belt overlying the openings $20^a$ and $20^b$ in the plate support 20 in order thus to minimize leakage or shunting to ground of current discharged from the electrode members through the material undergoing treatment. The belt 17, even though made of cotton, asbestos, canvas, or the like, is virtually a conductor of relatively high resistance and tends to form a shunt as above noted. Also, it is to be noted that the portion of the belt that is at any instant underneath the electrode structure 27 (or 28) does not coincide with an equi-potential surface as it extends transversely of the general axis of the discharge from any electrode tip $z$. Accordingly, the portion of the belt under consideration is subjected to differences of potential acting in its plane and these differences of potential cause current flows in the belt. The spacing above-mentioned between the belt-supporting pulleys or rollers with the consequent extensions to the right and left of the belt from the active discharge regions minimizes loss of energy and cooperates to maintain the actions above described.

With respect to the electrode construction 28 and its individual electrode members $28^a$, $28^b$, etc., substantially similar actions as above described take place but the opposite directions of rotation of the electrode structures 27 and 28 come into important consideration where the material undergoing treatment is packaged or contained in cartons, such as pasteboard boxes and the like.

In Figure 6 I have indicated at F by a series of arrows arranged in a circle, the path of movement of the electrode members of the part 27 of Figure 1 and have shown a package $C^1$ about to emerge from the treatment zone and a package $C^2$ having its leading ends already entered into the treatment zone. In Figure 7 I have indicated by the circle of arrows G the path and its direction of the electrode members of the part 28 of Figure 1 and have shown the package $C^1$ about to emerge from the treatment zone and the package $C^2$ with its forward end just entered into the treatment zone. In each instance diagrammatically portrayed in Figures 6 and 7 I have divided the treatment zone into two halves lying to either side of a vertical plane indicated by the line X—X in Figure 6 and line Y—Y in Figure 7.

Considering first Figure 6 and the package $C^2$, it will be noted that, due to the direction of rotation of the electrode structure 27, the electrode tips $z$ pass downwardly (as viewed in Figure 6 which is a plan view) and hence in a curved path across the package $C^2$ while the path of movement of the electrode tips and the above-described action thereof on the package $C^1$ (which has already traversed the path of movement of the package $C^2$) is upwardly and hence crosswise of the package but in a direction reversed from that in which the action took place while the package $C^1$ was to the left of the plane X—X. These actions are repeated, as is diagrammatically indicated in Figure 7, when the package moves through the treatment zone underneath the rotating electrode 28. The resultant actions are important in that they insure treatment of the material contained in the packages adjacent both side walls $a$ and $b$ of the packages.

Due to certain possible electrical actions that might take place, caused mainly by the vertical walls of the container or package, there is a tendency, considering now the package $C^2$ in Figure 6, for the corona discharge to start through the package and hence through its contents only after the particular electrode tip has moved some distance downwardly, as viewed in Figure 6, from the side walls $a$, leaving the possibility that portions of the contents of the package immediately adjacent the side wall $a$ are untreated; this action has a tendency to take place due to such factors as flux refraction and the concentration of flux along the outer face of the wall $a$ with the tendency to cause the discharge to persist along that outer face from an electrode tip approaching the carton. Such persistance of the discharge over the outer surface persists until the electrode tip has moved over the carton and downwardly (as viewed in Figure 6) a slight distance from the wall $a$ whereupon that surface discharge ceases and the action above-described in detail is established and continues through the remainder of the contents up to the other side wall $b$. The product is therefore thoroughly treated excepting adjacent the wall $a$ which the electrodes approach as they rotate. But when the package comes into that portion of the treatment zone to the right of the plane X—X of Figure 6, these actions are reversed and whatever of the contents of the package adjacent the wall $a$ where the package occupied the position $C^2$ that remained insufficiently treated are now thoroughly treated as the package passes through the position $C^1$. These actions are repeated when the package passes through the treatment zone under the electrode structure 28.

However, the upper half portion of the leading end wall $c$ (as viewed in Figure 6) acts like the side wall $a$ above-described in connection with the package $C^2$ of Figure 6 so that no or an insufficient amount of sterilization of the contents immediately adjacent that half portion takes place while the lower half portion of the leading end wall $c$, like the side ball $b$ of the package $C^2$ of Figure 6, does not have this detrimental action or effect. Stated differently, where the movement of the electrode is in a direction to "wipe" the discharge onto the package, there is insufficient sterilization or failure of sterilization of the product immediately adjacent the side walls of the package while this detrimental action does not take place where the movement of the electrode with respect to the package is in a direction to "wipe" the discharge off of the package. At the rear end wall $d$ of the carton a similar action takes place excepting that there is failure or deficiency of sterilization of the product adjacent the lower half of the end wall $d$, as viewed in Figure 6, and complete sterilization of the product adjacent the upper half wall thereof.

However, as the carton $C^2$, referring now to Figure 7, becomes subject to the treatment zone under the oppositely rotating electrode structure 28, these actions are reversed and any possible absence or deficiency of sterilization of the material adjacent the respective half portions of the end walls is remedied and cured.

With the condenser plate 50 related to the electrode members, as descrbed above, I am enabled to achieve a greatly improved action of the apparatus. For example, with the plate 50, shaped as is indicated in Figure 2, I am enabled to achieve a better control of the flux and in fact achieve a better flux concentration. The plate 50 thus provides a well defined conductive member for receiving the flux emanating from the electrode tips; it acts, generally speaking, to draw the flux lines together and to prevent substantial loss or straying of flux beyond the confines of the area of this plate. Also, I have found that I am enabled to achieve satisfactory sterilization at a somewhat lower voltage than would otherwise be necessary; this advantage is important inasmuch as saving in electrical energy input is achieved and also insulation difficulties lessened.

The vertical adjustment of the electrode disks 27 and 28 by means of the hand-wheel 49 and the vertical adjustment of the coacting condenser plate 50 by means of the hand-wheel 56 have been above described, it being understood that any suitable means (not shown) may be utilized for insuring proper guiding of these movable parts and for insuring maintenance of parallelism of their respective planes as their respective positions are changed to meet various conditions. Products of different characteristics require different voltages for carrying out the actions above described but by means of the hand-wheels 49 and 56 I am enabled, with a given voltage at the high voltage winding 33 of the transformer, to meet these varying requirements.

For example, let it be assumed that flour is to be sterilized instead of the above illustratively described corn-meal. Flour requires a higher voltage than does corn-meal and by raising the condenser plate 50 appropriately, I am enabled to make effective upon the flour a suitable potential. Raising the condenser plate 50 increases the electrical capacity of the system and more particularly increases the ratio of the capacity between the material being treated and the condenser plate 50 to the capacity between the electrode structure and the material being treated over what it was before; when, therefore, the actions above described take place, the voltage applied to the apparatus by transformer 36—33 is divided into two potential drops, a potential drop through the latter capacity proportional to the former capacity and a potential drop through the former capacity proportional to the latter capacity. The available potential is distributed between these two serially related capacities but inversely as their electrical capacities.

Thus, I am enabled to meet a wide variety of conditions or requirements met with in practice. Also, the arrangement above described, makes for a wide flexibility and adaptability. For example, the thickness of the material or layer of material undergoing treatment may vary as, for example, when packaged goods of a different size of package have to be treated. In such case I am enabled quickly, by manipulating hand-wheel 49, to give the electrode structure or structures the requisite or desired height above the material-carrying portion of the belt 17 and at once to compensate for such a change in the position of the active electrode member or members by re-setting condenser plate 50 by way of hand-wheel 56. Also, a change in size of package, for example, might be accompanied by a change in the character of product contained therein. For example, corn-meal might be packaged in one size of package the flour might be packaged in a different size. Thus, new conditions, dictated not only by the size of the package but also by the electrical requirements of the change in characteristic of the product, have to be arrived at, but it will now be seen that such conditions can be quickly and readily effected.

In conjunction with the re-setting of the electrical parts of the apparatus to meet such requirements as have been illustratively above described, I may also change the voltage applied to the apparatus by suitably adjusting the variable resistance 63 to change the voltage of the alternator 39 and thus I am enabled to meet the many varying conditions met with in practice.

Figure 8:
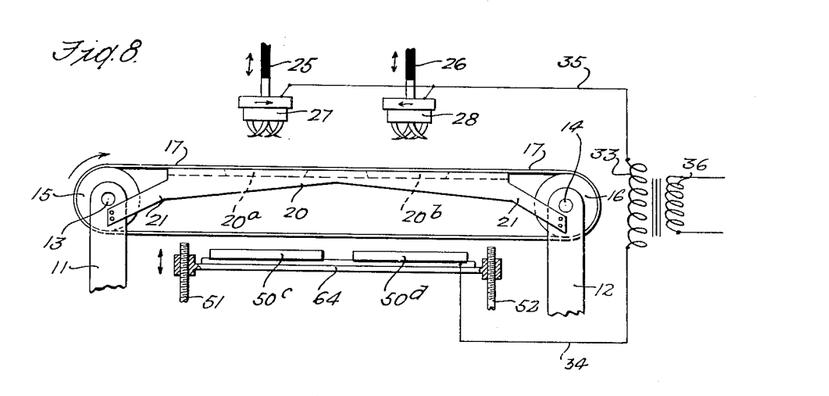
Figure 8 is a view like that of Figure 1 but showing a modified form of apparatus, certain parts being omitted to avoid repetition and in view of their disclosure in Figure 1.
Figure 9:
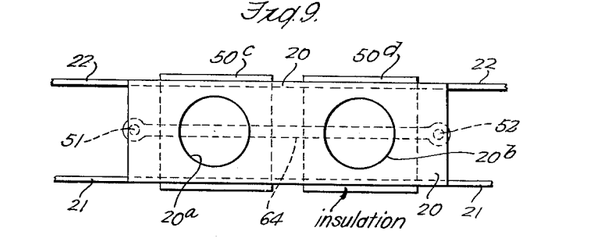
Figure 9 is a fragmentary plan view of the conveyor belt support and condenser plates thereunder.

In Figures 8 and 9 I have shown a possible modification of the arrangement above-described in connection with Figures 1 and 2 and turning now to Figures 8 and 9 it will be seen that the disk-like electrode members illustratively shown as two in number, namely, members 27 and 28, but which, in all of the apparatuses herein described, may be of any suitable or desirable number, coact, instead of with a single or common condenser plate 50, as in Figure 1, with individual condenser plates, one for each electrode structure or disk. Thus, a condenser plate 50ᶜ is positioned underneath and coaxially with the electrode structure 27 and this plate is preferably substantially square (see Figure 9) and is positioned in line with and underneath the opening 20ᵃ in the plate 20. A similar plate 50ᵈ is similarly related to electrode structure 28.

Plates 50ᶜ and 50ᵈ are supported by a cross-beam 64 which is preferably metallic and the latter is in turn suitably related to the elevating screws 51 and 52.

With this arrangement I achieve a number of distinctive advantages. Among these may first be noted that the individual condenser plates achieve a still better flux concentration or control and more particularly counteract the tendency of the flux from spreading or straying in a direction lengthwise of the belt. The plates alined with their respective electrode structures and also with the openings in the belt-supporting plate 20 insure a better action of these openings and in coaction therewith achieve better flux control and better concentration of flux than is achievable by the arrangement of Figure 1.

Also, the use of individual condenser plates for each electrode structure better segregates the otherwise parallel circuits and makes for better safety of operation. For example, should a batch or package of material that, for any reason, might be in such condition, for example, wet, as to give the package or material an unusual or unexpectedly high permittivity, it, as it enters into operative relation to the first of a series of electrode structures, would act substantially like a short-circuit or very low resistance conductor of so much of the discharge path as is represented by the thickness of the package or material; the resultant increased current flow, however, is limited to a safe value by the size and position of the condenser plate 50ᶜ underneath the first electrode structure and would not be unduly or perhaps undesirably increased, as might be the case if the electrode structure under which the package or batch of material happens to be could directly coact with a large condenser plate extending throughout the length of the apparatus. Under certain conditions of practical use, this feature of the arrangement of Figures 8 and 9 is highly advantageous though, as has already been made clear, excellent results are achieved by the arrangement of Figures 1 and 2.

The electrode structures 27 and 28 of Figure 8 are, of course, adjustable as was described in connection with Figure 1 and in conjunction with the setting of condenser plates 50ᶜ and 50ᵈ, etc., a wide variety of practical conditions can be effectively coped with.

Figure 10:
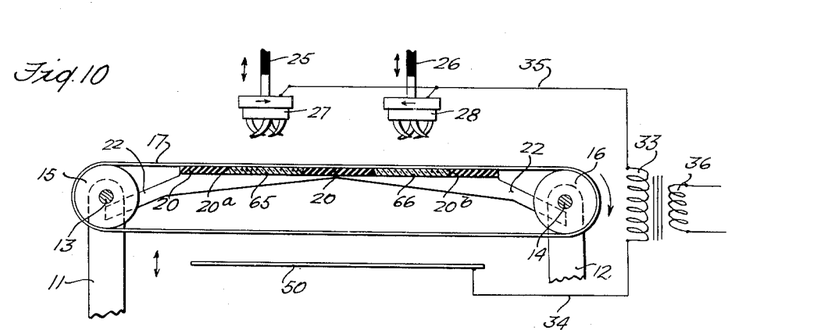
Figure 10 is a view like that of Figure 1 showing another embodiment of the apparatus of my invention, certain parts being again omitted to avoid repetition and certain parts being shown in longitudinal vertical central section.

In Figure 10 I have shown a possible modified form of my invention and in this embodiment I employ the structure features above described in connection with Figure 1 but immediately underneath the respective electrode structures 27 and 28, for example, but so that the material to be treated passes therebetween and the electrodes, a material of relatively high permittivity; conveniently and preferably I form this material into the shape of disk-like members and seat them into the respective openings provided in the belt-supporting plate or structure 20 (see Figure 2). In Figure 10 the openings 20ᵃ and 20ᵇ in this belt-supporting structure 20 are shown as having disk-like plates 65 and 66 of solid dielectric material of relatively high permittivity. Members 65 and 66 may be made of fused quartz, whose permittivity is on the order of 3 or by way of further example they may be made of pyrex glass whose permittivity is on the order of 4.5. Any suitable means may be provided mechanically to hold these parts in position. A common condenser plate 50 arranged and constructed like that of Figure 1 coacts with the electrode structures and the above-mentioned parts.

With this arrangement I am enabled to increase the potential drop through the material or packaged material that is being treated. Bearing in mind that the available potential applied to the electrodes and to the condenser plate coacting therewith is distributed substantially inversely as the permittivities of the dielectrics in the flux path, the relatively high permittivity of the members 65 and 66 causes a greater fraction of the applied voltage to be dissipated at the potential drop through the material. The electrical capacity of the system is also increased by this arrangement and particularly the capacity between the material or packaged material on the belt and the grounded potential plate 50; the applied voltage, distributing itself in potential drops inversely as the serially arranged capacities in the flux path, is thus made to have a greater fraction thereof dissipated as a potential drop between the electrodes and the material or packaged material undergoing treatment. Thus, with a given applied voltage, I am enabled to bring into action a higher voltage effective upon the material but without increasing the applied voltage.

This action may be amplified or increased by raising the condenser plate 50 or it may be diminished by lowering the condenser plate 50. And with the independent or conjoint seating of the electrode structures and of the condenser plate 50, I am enabled to meet a great variety of practical requirements.

A distinctive advantage of the arrangement of Figure 10 is that I am enabled to achieve dependable sterilization with a lesser applied voltage than would otherwise be necessary. Viewed in a different light, I can make effective upon the material being treated a suitably large fraction of this lower applied voltage as distinguished from making effective a smaller fraction of a much higher applied voltage.

Figure 11:
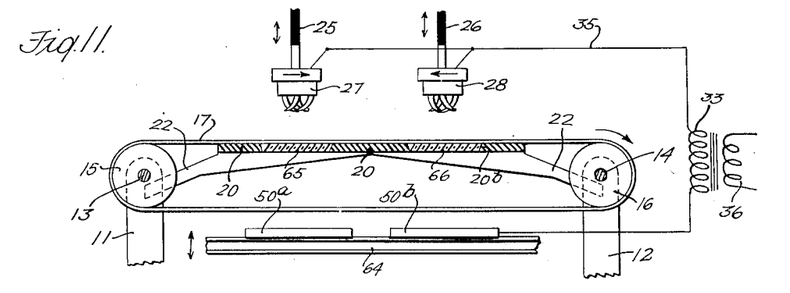
Figure 11 is a view similar to that of Figure 10 but showing another possible embodiment of certain features of my invention.

In Figure 11 I have diagrammatically shown an arrangement in which the high permittivity members 65 and 66 of Figure 10 are again employed but in which the advantages of the construction of Figure 10, as well as the advantages of the segregated condenser plate arrangement of Figure 9, may be together achieved. In Figure 11 the various electrode structures 27, 28, etc., instead of coacting with a single condenser plate 50, as in Figure 10, coact individually with their respective condenser plates 50ᵃ and 50ᵇ, which are constructed, mounted, and arranged as was described above in connection with Figures 8 and 9.

Figure 12:
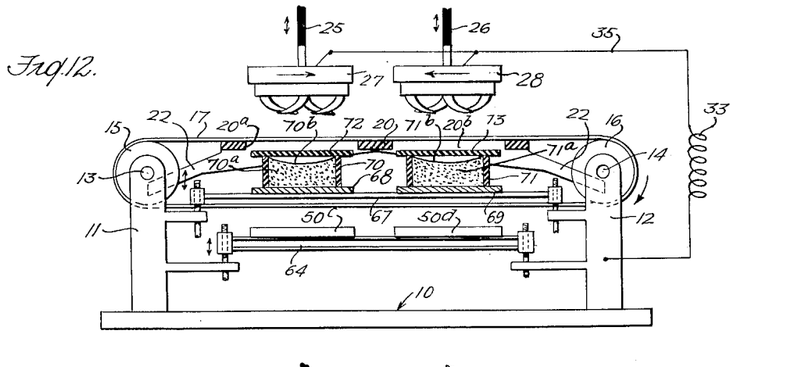
Figure 12 is a view similar to that of Figure 1 but showing another embodiment of certain mechanical and electrical features of my invention, certain parts being again omitted to avoid repetition and certain parts being shown in longitudinal vertical central section.

Turning now to Figure 12, I have there shown another embodiment of certain features of my invention; electrode structures, illustratively two in number and indicated at 27 and 28 and constructed and arranged as above described, coact with condenser plates 50ᶜ and 50ᵈ mounted, constructed, and arranged as described above in connection with Figures 8 and 9, but also coact with certain other features. Positioned above the lower strand of the conveyor belt 17 and preferably supported by the belt-supporting insulating structure 20 (see Figure 2) is a frame-work 67 preferably of suitable structural steel construction and preferably also mounted in any suitable manner for adjustment in a vertical direction. Conveniently, the frame-like part 67 may be supported from the arms 21 and 22 (see Figure 12) of the belt-supporting structure 20 and the connection therebetween, as is indicated in Figure 12, is such that the member 67 may be raised or lowered at will.

Part 67 carries a plurality of condenser plates preferably in the form of suitable metal plate-like members, one for each of the electrode structures; since I have illustratively shown two of the latter, though it is to be understood that I may employ more than two, I have shown two condenser plates 68 and 69, one for each electrode structure, and dimensioned substantially the same as are the condenser plates $50^c$ and $50^d$. Intervening condenser plates 68 and $50^c$ and condenser plates 69 and $50^d$ is a suitable air space, the vertical dimension of which may be varied either by varying the height of the condenser plates $50^c$ and $50^d$ by the handwheel 56 or by varying the height of the condenser plates 68 and 69.

Resting upon condenser plate 68 is a tube-like member 70 having a mean or average diameter substantially equal to the diameter of the circle of the electrode tips $z$ (see Figures 3 and 4). Member 70 is made of solid dielectric material of relatively high permittivity; it may, for example, be made of dilecto and, for a given setting of the part 67, extends upwardly to within a relatively short distance of the upper strand of the belt 17; preferably the diameter of the opening $20^a$ in the belt-supporting member 20 is materially larger than the outside diameter of the member 70. A similar member 71 is carried by the condenser plate 69.

The member 70, being of substantial thickness in a radial direction and being of a diameter commensurate with the diameter of the circular path of the rotating electrode tips $z$, provides a flux path that is of relatively high permittivity. The permittivity in the illustrative example above-mentioned wherein the parts 70 and 71 are made of dilecto of on the order of 5.5; these tube-like members, by way of further illustration, may also be made of pyrex glass or fused quartz and would then have the permittivities of these materials. In effect, the members 70 and 71 provide a flux path of annular cross-section that is of lower reluctance and hence the dielectric flux seeks this path and is substantially concentrated therein. This arrangement thus insures a high concentration of flux in the air space between the electrode tips and the underlying belt portion so that when the material or packaged material enters this space a high flux concentration therethrough is dependably assured and loss or straying of flux is counteracted. Dielectric flux lines, emanating from the electrode structure, that would otherwise tend to spread out or diffuse with resultant decrease in flux intensity in the treatment zone, are thus drawn together by the effect or action of the member 70 and a high flux density in the treatment zone achieved.

This action may be enhanced and other advantages achieved by filling the annular-like members 70 and 71 with an appropriate solid dielectric material indicated at $70^a$ and $71^a$, respectively, such material conveniently taking the form of wax or paraffin whose permittivity is greatly in excess of that of air. The wax also prevents the possibility of accumulation of moisture on the inside surfaces of the members 70—71 as might result from the condensation of moisture of air pocketed therein. The wax coacts with the solid dielectric material of the parts 70 and 71 in that together they furnish a high permittivity path of large cross-section which the flux seeks out and in which it is concentrated and is thus drawn inwardly and prevented from diminishing the effective flux density in the treatment zone.

I prefer to use paraffin whose permittivity is on the order of 2 and I also prefer to dish or concave the upper surface thereof as is indicated at $70^b$ and $71^b$; these factors aid in concentrating the flux through the annular path defined by the members 70 and 71 and thus contribute toward achieving a high flux density in the treatment zone.

The action of the apparatus of Figure 12 will perhaps be clear in view of what has already been set forth above in connection with various of the features embodied in the other arrangements above described. It might be noted, however, that, aside from achieving the high flux density in the treatment zone as above-described, the arrangement of Figure 12 also makes it possible to achieve a higher potential drop effective upon the material undergoing treatment without necessitating increase in the applied voltage; this action is achieved because of the inverse distribution of the potential drops throughout the circuit effective in any one treatment zone is determined by the permittivities of the dielectrics serially arranged in that circuit. The electrical capacity between the condenser plates 68 and $50^c$ and the condenser plates 69 and $50^d$ is maintained at such a value that the air dielectric therebetween can safely withstand, without arc-over or complete break-down, the potential drop imposed upon it due to the change in electrical conditions in the circuit when the material enters the treatment zone and corona discharge in the latter takes place.

The arrangement of Figure 12 provides a still greater adaptability to varying conditions of practical use. I may not only set the vertical height of the electrode structures but also I may determine or set the vertical height of the part 67 and hence of the condenser plates 68 and 69 carried thereby and I may also determine at will the spacing between the latter condenser plates and condenser plates $50^c$ and $50^d$; any of these settings I may use individually or alone or two or more of them in conjunction with each other. I also provide for changing the effect of the members 70 and 71 and their associated parts $70^a$ and $71^a$ (where I employ the latter) by replacing them with like parts of different vertical dimension. These factors make it possible for me to change the voltage distribution, for example, between the electrode structure and the material undergoing treatment, between the material undergoing treatment and the condenser plate 68, or between the condenser plate 68 and condenser plate $50^c$, and thus I may achieve any desired distribution of potential drops or a fractionating of the applied potential, as will make effective upon the particular material being treated the desired or appropriate potential. Also, by means of the embodiment shown in Figure 12, I am enabled further to diminish the applied voltage necessary because, for example, I am enabled to insure the achievement of a greater fraction of the applied voltage as a potential drop through the material than would otherwise be the case.

Preferably I seat upon the upper ends of dielectric members 70—71 disk-like members 72 and 73, respectively, of solid dielectric material, such as fused quartz or pyrex glass, these members having diameters somewhat in excess of the outside diameter of the flux concentrating members 70 and 71. With this arrangement I greatly lengthen the surface leakage path leading toward the condenser plates 68 and 69, respectively, and thus I am able to prevent or greatly minimize any tendency toward direct surface arcover to these condenser plates.

Figure 13:
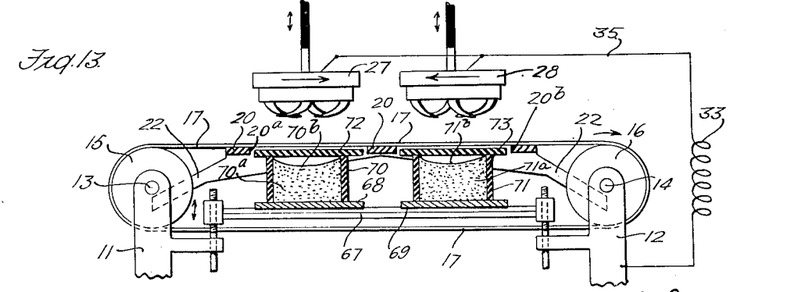
Figure 13 is a view similar to that of Figure 12 but showing a preferred electrical and mechanical form of certain features of the embodiment of Figure 12.

Turning now to Figure 13, I have there shown an arrangement in many respects not unlike the arrangement above-described in connection with Figure 12. In the apparatus of Figure 13 I have omitted the condenser plate structure 50$^c$ and 50$^d$ and its adjustment and I have connected the grounded side of the high voltage transformer winding 33 to the condenser plates 68 and 69; in that case, I achieve excellent flux concentration and high flux density in the treatment zone, as will be clear from what I have said above in connection with Figure 12, but I so proportion the solid dielectric members 70 and 71 (and also and commensurately the members 70$^a$ and 71$^a$ where I employ the latter) that the condenser formed, during the treatment of the material, between the material itself and the condenser plates 68 (or 69 as the case might be) is adequate to withstand safely and without complete break-down or arc-over the potential made effective thereon when the corona discharge through the material takes place. In that case, members 72 and 73 are particularly advantageous and are preferably employed to so lengthen the surface leakage path as to prevent surface leakage with resultant tendency to arc-over along the outer surface of the member 70 (or member 71 as the case may be).

It is to be understood that various structural features described in detail and shown also in detail in connection with Figure 1 but not shown in detail in Figures 8–13, are to be understood as embodied in the latter in which they have been omitted in order to simplify a more ready understanding of the various features of sterilizing construction and action employed. It is also to be understood that the advantages, actions, and constructions, of the rotating electrodes described above in detail in connection with Figures 1–7 are characteristic of the arrangements of Figures 8–13 but that, insofar as certain features of my invention are concerned, I do not wish to be limited to rotation of the electrodes or to certain of the actions that result from the construction and rotation thereof, inasmuch as these certain features may be dependably employed and their manifold and thoroughly practical advantages achieved in other electrode arrangements; however, these particular features, in coaction with the rotating electrodes and the action and advantages of the latter, I have found particularly advantageous to meet certain peculiar conditions or requirements met with in practical use.

It will thus be seen that there has been provided in this invention an art and apparatus in which the various objects hereinbefore set forth, together with many thoroughly practical advantages, are successfully achieved.

I do not claim herein the combinations of features and elements whereby, due to movement of the discharge electrode or electrodes, all as hereinabove described particularly in connection with Figures 6 and 7, sterilization of the material adjacent the side or end walls of the package is achieved, having made claims to such subject matter in my co-pending application, Serial No. 577,521, filed November 27, 1931, to which reference should be made in that connection. Also, I make no claim herein to the combinations of features and elements whereby the important actions above described particularly in connection with Figures 4 and 5 are achieved, having claimed that subject matter both broadly and specifically in my above-mentioned co-pending application to which reference in that connection is directed.

As many possible embodiments may be made of the mechanical features of the above invention, and as the art herein described might be varied in various parts, all without departing from the scope of the invention, it is to be understood that all matter hereinabove set forth or shown in the accompanying drawings, is to be interpreted as illustrative and not in a limiting sense.

I claim:

1. In electrical sterilizing apparatus, in combination, a source of high potential; means connected thereto and including a plurality of air condensers in parallel, the air dielectric of which is of sufficient dimension to withstand breakdown by said high potential; and means for introducing a product to be treated into the air dielectric of successive condensers along a path sufficiently close to one of the condenser elements to cause local rupture through the product but sufficiently distant from the other condenser element to prevent complete break-down of the condensers.

2. In electrical sterilizing apparatus, in combination, a source of high potential; capacity-forming means connected thereto and including electrode means having a plurality of discharge points lying substantially in a single plane and a common plate-like member spaced from said plane, the space between said plate member and said plane being filled with air; means for passing a product to be sterilized through said space along a path sufficiently close to said discharge points to effect local rupture through the product but sufficiently spaced from said plate member to prevent complete break-down between said discharge points and said plate member; and means for predetermining the relative spacings between said electrode points and said path and between said path and said plate member in accordance with the dielectric properties of the material to be treated.

3. In electrical sterilizing apparatus, in combination, a source of high potential; capacity-forming means connected thereto and including electrode means having a plurality of discharge points lying substantially in a single plane and a common plate-like member spaced from said plane, the space between said plate member and said plane being filled with air; means for passing a product to be sterilized through said space along a path sufficiently close to said discharge points to effect local rupture through the product but sufficiently spaced from said plate member to prevent complete break-down between said discharge points and said plate member; and means for substantially concentrating the dielectric flux within substantially the area defined by said plurality of discharge points.

4. In electrical sterilizing apparatus, in combination, a source of high potential; capacity-forming means connected thereto and including electrode means having a plurality of discharge points lying substantially in a single plane and a common plate-like member spaced from said plane, the space between said plate member and said plane being filled with air; means for passing a product to be sterilized through said space along a path sufficiently close to said discharge points to effect local rupture through the product but sufficiently spaced from said plate member to prevent complete break-down between said discharge points and said plate member; and solid dielectric means of relatively high permittivity for preventing straying of dielectric flux.

5. In electrical sterilizing apparatus, in combination, a source of high potential; means forming a condenser connected across said source of potential, said means including a disk-like electrode structure having a plurality of discharge tips maintained at high potential and with the discharge tips in a substantially horizontal plane, and plate-like means spaced downwardly therefrom and with the intervening space filled with air; means for passing a product to be treated along a substantially horizontal path that is in closer proximity to said discharge tips than to said plate-like means; and a disk-like member of solid dielectric material in the space between the path taken by said product and said plate-like means, said solid dielectric member and the air dielectric in series therewith having a dielectric strength sufficient to withstand the potential of said source without break-down.

6. In electrical sterilizing apparatus, in combination, a source of high potential; capacity-forming means connected thereto and including electrode means having a plurality of discharge points lying substantially in a single plane and a common plate-like member spaced from said plane, the space between said plate member and said plane being filled with air; means for passing a product to be sterilized through said space along a path sufficiently close to said discharge points to effect local rupture through the product but sufficiently spaced from said plate member to prevent complete break-down between said discharge points and said plate member; and means for determining at will the fraction of said high potential that is effective as a potential drop through the product to be sterilized.

7. In electrical sterilizing apparatus, in combination, a source of high potential; capacity-forming means connected thereto and including electrode means having a plurality of discharge points lying substantially in a single plane and a common plate-like member spaced from said plane, the space between said plate member and said plane being filled with air; means for passing a product to be sterilized through said space along a path sufficiently close to said discharge points to effect local rupture through the product but sufficiently spaced from said plate member to prevent complete break-down between said discharge points and said plate member; and solid dielectric means for affecting the fraction of said high potential that is effective as a potential drop through the product to be sterilized.

8. In electrical sterilizing apparatus, in combination, a source of high potential; capacity-forming means connected thereto and including electrode means having a plurality of discharge points lying substantially in a single plane and a common plate-like member spaced from said plane, the space between said plate member and said plane being filled with air; means for passing a product to be sterilized through said space along a path sufficiently close to said discharge points to effect local rupture through the product but sufficiently spaced from said plate member to prevent complete break-down between said discharge points and said plate member; and means for changing the spacing between said path and said plate member.

9. In electrical sterilizing apparatus, in combination, a source of high potential; capacity-forming means connected thereto and including a plurality of disk-like electrode members each having a plurality of discharge points lying substantially in a single plane and conductive means spaced from said plane, the spacing therebetween being filled with air and being sufficiently great to withstand said high potential without break-down of said air dielectric; means for passing a product to be sterilized through said space along a path sufficiently close to said discharge points to effect local rupture through the product but sufficiently spaced from said conductive means to prevent complete break-down between the latter and said discharge points; and means of circular cross-section in the path of dielectric flux for substantially concentrating the latter in the treatment zone.

10. In electrical sterilizing apparatus, in combination, a source of high potential; capacity-forming means connected thereto and including a plurality of disk-like electrode members each having a plurality of discharge points lying substantially in a single plane and conductive means spaced from said plane, the spacing therebetween being filled with air and being sufficiently great to withstand said high potential without break-down of said air dielectric; means for passing a product to be sterilized through said space along a path sufficiently close to said discharge points to effect local rupture through the product but sufficiently spaced from said conductive means to prevent complete break-down between the latter and said discharge points; and means for determining at will the distribution of said high potential between said product and the space between the latter and said conductive means.

11. In electrical sterilizing apparatus, in combination, a source of high potential; capacity-forming means connected thereto and including a plurality of disk-like electrode members each having a plurality of discharge points lying substantially in a single plane and conductive means spaced from said plane, the spacing therebetween being filled with air and being sufficiently great to withstand said high potential without break-down of said air dielectric; means for passing a product to be sterilized through said space along a path sufficiently close to said discharge points to effect local rupture through the product but sufficiently spaced from said conductive means to prevent complete break-down between the latter and said discharge points, said discharge points being arranged in a circle; and means of annular cross-section and having a diameter commensurate with the diameter of the circle of said electrode points for guiding the dielectric flux in said capacity-forming means.

12. In electrical sterilizing apparatus, in combination, a conveyor belt for transporting a product to be sterilized; electrode means above said conveyor belt; electrode means below said conveyor belt; a source of high potential, the spacing between said electrode means being such that intervening air spaces withstand complete rupture even during local rupture through the product on the belt; and means for determining at will the distribution of said potential as potential drops through the product to be treated and through said air spaces.

13. In electrical sterilizing apparatus, in combination, a conveyor belt for transporting a product to be sterilized; electrode means above said conveyor belt; electrode means below said conveyor belt; a source of high potential, the spacing between said electrode means being such that intervening air spaces withstand complete rupture even during local rupture through the product on the belt; means for determining at will the spacing of said electrode means above said belt; and means for determining the spacing of said other electrode means below said belt.

14. In electrical sterilizing apparatus, in combination, a conveyor belt for transporting a product to be sterilized; electrode means above said conveyor belt; electrode means below said conveyor belt; a source of high potential, the spacing between said electrode means being such that intervening air spaces withstand complete rupture even during local rupture through the product on the belt; and solid dielectric means interposed between said belt and said second-mentioned electrode means and in the path of effective dielectric flux emanating from said electrode means.

15. In electrical sterilizing apparatus, in combination, a conveyor belt for transporting a product to be sterilized; electrode means above said conveyor belt; electrode means below said conveyor belt; a source of high potential, the spacing between said electrode means being such that intervening air spaces withstand complete rupture even during local rupture through the product on the belt; and solid dielectric means between said belt and said second electrode means and having a surface leakage path in the direction of the dielectric field that is longer than the vertical dimension of said solid dielectric means.

16. In electrical sterilizing apparatus, in combination, a conveyor belt for transporting a product to be sterilized; electrode means above said conveyor belt; electrode means below said conveyor belt; a source of high potential, the spacing between said electrode means being such that intervening air spaces withstand complete rupture even during local rupture through the product on the belt; and solid dielectric means of lesser thickness than the spacing between said belt and said second electrode means and interposed in said space and substantially in the path of effective dielectric flux emanating from said electrode means.

17. In electrical sterilizing apparatus, in combination, a conveyor belt for transporting a product to be sterilized; electrode means above said conveyor belt; electrode means below said conveyor belt; a source of high potential, the spacing between said electrode means being such that intervening air spaces withstand complete rupture even during local rupture through the product on the belt; and solid dielectric means of lesser thickness than the spacing between said belt and said second electrode means and interposed in said space, said solid dielectric means having a longer surface leakage path in the direction of the dielectric field than its own vertical dimension.

18. In electrical sterilizing apparatus, in combination, a source of high potential; capacity-forming means connected thereto and including rotatable electrode means having a plurality of electrode tips lying substantially in a single plane and conductive means spaced from said plane; means for rotating said electrode means; means for passing a product to be sterilized through said space along a path sufficiently close to said electrode tips to effect local rupture through the product but sufficiently spaced from said conductive means to prevent complete break-down between the said tips and said conductive means; and means for concentrating the dielectric flux into substantially an annulus having a diameter commensurate with the diameter of the circle defined by said electrode tips as the latter rotate.

19. In electrical sterilizing apparatus, in combination, a source of high potential; capacity-forming means connected thereto and including rotatable electrode means having a plurality of electrode tips lying substantially in a single plane and conductive means spaced from said plane; means for rotating said electrode means; means for passing a product to be sterilized through said space along a path sufficiently close to said electrode tips to effect local rupture through the product but sufficiently spaced from said conductive means to prevent complete bread-down between the said tips and said conductive means; and means for concentrating the dielectric flux emanating from said rotating electrode tips.

20. In electrical sterilizing apparatus, in combination, a source of high potential; capacity-forming means connected thereto and including rotatable electrode means having a plurality of electrode tips lying substantially in a single plane and conductive means spaced from said plane; means for rotating said electrode means; means for passing a product to be sterilized through said space along a path sufficiently close to said electrode tips to effect local rupture through the product but sufficiently spaced from said conductive means to prevent complete break-down between the said tips and said conductive means; and a disk-like member of solid dielectric material of relatively high permittivity and having a diameter commensurate with the diameter of the circle defined by said rotating electrode tips interposed in the path of flux.

21. In electrical sterilizing apparatus, in combination, a source of high potential; capacity-forming means connected thereto and including rotatable electrode means having a plurality of electrode tips lying substantially in a single plane and conductive means spaced from said plane; means for rotating said electrode means; means for passing a product to be sterilized through said space along a path sufficiently close to said electrode tips to effect local rupture through the product but sufficiently spaced from said conductive means to prevent complete bread-down between the said tips and said conductive means; and an annular solid dielectric member having a mean diameter commensurate with that of the circle defined by said rotating electrode tips positioned in the path of flux for concentrating the latter.

22. In electrical sterilizing apparatus, in combination, a source of high potential; capacity-forming means connected thereto and including rotatable electrode means having a plurality of electrode tips lying substantially in a single plane and conductive means spaced from said plane; means for rotating said electrode means; means for passing a product to be sterilized through said space along a path sufficiently close to said electrode tips to effect local rupture through the product but sufficiently spaced from said conductive means to prevent complete break-down between the said tips and said conductive means; an annular solid dielectric member having a mean diameter commensurate with that of the circle defined by said rotating electrode tips positioned in the path of flux for concentrating the latter; and means for lengthening the leakage path along said solid dielectric member.

23. In electrical sterilizing apparatus, in combination, a source of high potential; means forming a discharge path therefor and including a rotatable electrode tip and conductive means spaced therefrom; means for rotating said electrode tip at relatively high speed and to define a circle in its rotation; means for passing a product to be sterilized through said space along a path sufficiently close to said rotating electrode tip to prevent local rupture through the product but sufficiently spaced from said conductive means to prevent complete break-down between said tip and the latter; and means occupying part of said space and forming a low reluctance path for the dielectric flux.

24. In electrical sterilizing apparatus, in combination, a source of high potential; means forming a discharge path therefor and including a rotatable electrode tip and conductive means spaced therefrom; means for rotating said electrode tip at relatively high speed and to define a circle in its rotation; means for passing a product to be treated along a path adjacent the plane of the circle defined by said rotating electrode tip; and means of solid dielectric material extending between said product and said conductive means and having a dielectric strength sufficient to withstand said high potential when local rupture through the product takes place.

25. In electrical sterilizing apparatus, in combination, a source of high potential; capacity-forming means connected thereto and including electrode means and conductive means spaced therefrom; means for passing a product to be sterilized along a path relatively close to said electrode means; and solid dielectric means extending substantially between the path of said product and said conductive means and in the path of effective dielectric flux emanating from said electrode means, and having a dielectric strength sufficient to withstand rupture when local rupture through the product takes place.

26. In electrical sterilizing apparatus, in combination, a source of high potential; capacity-forming means connected thereto and including electrode means and conductive means spaced therefrom; means for passing a product to be sterilized along a path relatively close to said electrode means; solid dielectric means extending substantially between the path of said product and said conductive means and having a dielectric strength sufficient to withstand rupture when local rupture through the product takes place; and means for increasing the length of the leakage path along said dielectric means and in the direction of the dielectric field.

27. The method of electrically sterilizing material such as food products or the like, which consists in placing the material in a stressed air dielectric to occupy only a portion of the latter and determining at will the potential drop through the material and through the air dielectric so that local break-down through the material takes place without rupturing the remaining portion of the air dielectric.

28. In electrical sterilizing apparatus, in combination, a source of relatively high potential, frame means at substantially ground potential, means related to said frame means and including spaced electrode means across which said source is effective, one of said electrode means being at the potential of said frame means, and means for positioning a material to be treated in between said electrode means, the other of said electrode means comprising a discharge electrode and means for rotating it, said rotating means comprising an electric motor supported by said frame means and an insulating driving connection between said rotating discharge electrode and said motor capable of withstanding the potential applied to said electrode.

29. In electrical sterilizing apparatus, in combination, a source of relatively high potential, frame means at substantially ground potential, means related to said frame means and including spaced electrode means across which said source is effective, one of said electrode means being at the potential of said frame means, and means for positioning a material to be treated in between said electrode means, the other of said electrode means comprising a discharge electrode and means for rotating it, said rotating means comprising an electric motor supported by said frame means and an insulating driving shaft between said motor and the rotatable discharge electrode, the insulating shaft having a length sufficient to insulate the motor from the high potential applied to said discharge electrode and to prevent creepage of high potential energy therealong.

30. In electrical sterilizing apparatus, in combination, a source of relatively high potential, spaced electrode means across which said source is effective; and means for positioning a material to be treated in between said electrode means, one of said electrode means comprising a discharge electrode and means for rotating it, said rotating means comprising an electric motor and an insulating driving connection between said rotating discharge electrode and said motor capable of withstanding the potential applied to said electrode, and means mounting said motor for bodily movement whereby the spacing between said spaced electrode means may be predetermined at will.

31. In electrical sterilizing apparatus, in combination, a source of high potential; means forming a condenser connected across said source of potential, said means comprising electrode means including a plurality of discharge electrodes and conductive means spaced therefrom and of relatively large area, the intervening space being filled with air; and means for supporting material to be treated in relatively close proximity to said electrode means but spaced sufficiently from said conductive means so that the intervening air dielectric can withstand the potential of said source when local break-down takes place through the material; and means for predetermining at will the relation between the distance representing the proximity of the material to said electrode means and the spacing of said material from said conductive means.

32. In electrical sterilizing apparatus, in combination, a source of high potential; capacity-forming means connected thereto and including a movable discharge electrode and conductive means spaced from said discharge electrode; means for passing a product to be sterilized through the space between said discharge electrode and said conductive means and along a path sufficiently close to said discharge electrode to effect local rupture through the product but sufficiently spaced from said conductive means to prevent complete break-down between the discharge electrode and said conductive means; means for moving said discharge electrode in a direction transversely of the path along which said product is passed by said product-passing means, and means on that side of said path remote from said discharge electrode for concentrating the dielectric flux emanating from said discharge electrode as the latter is moved along its path by said electrode-moving means.

FRANKLIN S. SMITH.